(No Model.)
H. R. BRAUNSDORF.
SAW SET.
No. 425,742. Patented Apr. 15, 1890.
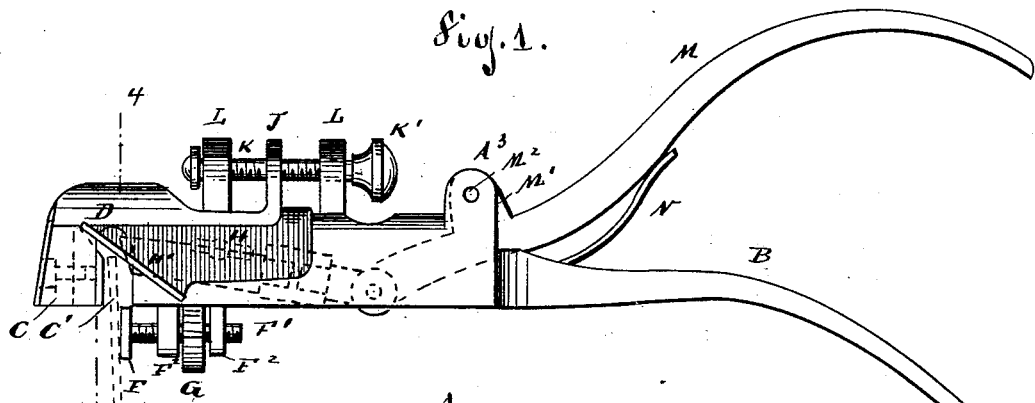
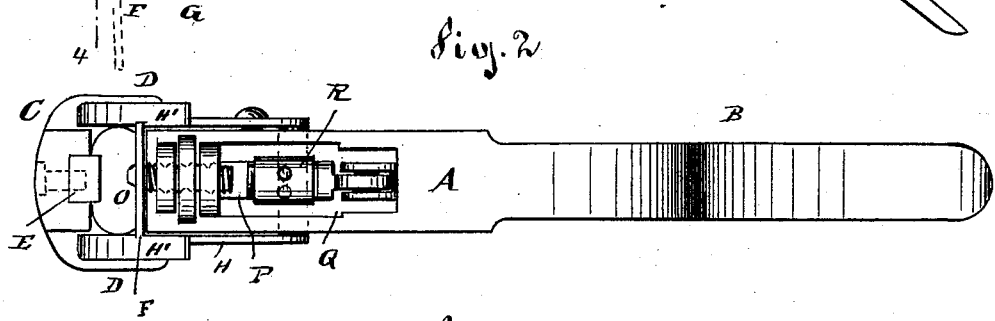
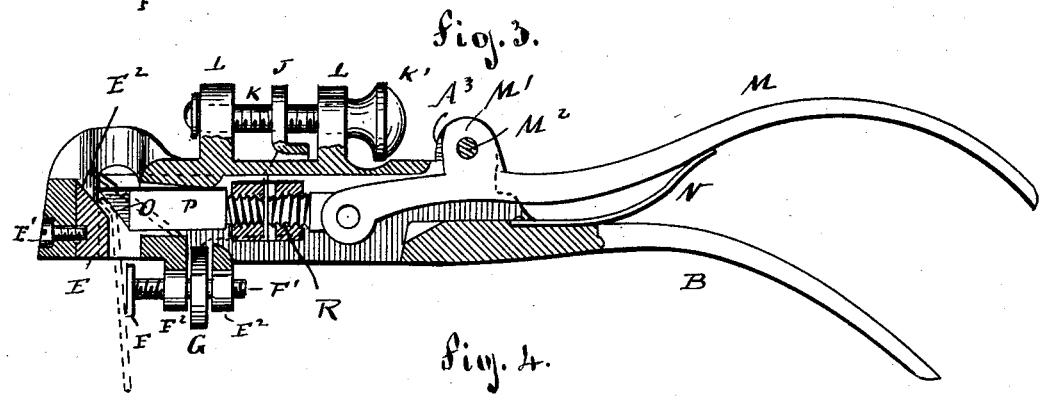
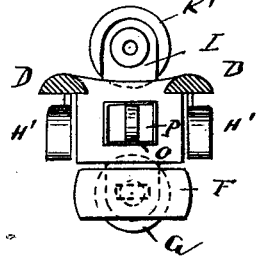
WITNESSES:
INVENTOR
Henry R. Braunsdorf
BY
ATTORNEYS

UNITED STATES PATENT OFFICE.

HENRY R. BRAUNSDORF, OF NEW YORK, N. Y.

SAW-SET.

SPECIFICATION forming part of Letters Patent No. 425,742, dated April 15, 1890.

Application filed December 28, 1889. Serial No. 335,180. (No model.)

*To all whom it may concern:*

Be it known that I, HENRY R. BRAUNSDORF, of the city, county, and State of New York, a citizen of the United States, have invented certain new and useful Improvements in Saw-Sets, of which the following is a specification.

The object of my invention is to provide a new and improved device for setting saws and by means of which the teeth of the saw-blades are not only bent laterally, but are also curved outward and downward, thereby preventing breaking off of the teeth while setting the saw.

The invention consists in the construction and combination of parts and details, as will be fully described hereinafter, and finally be pointed out in the claims.

In the accompanying drawings, Figure 1 represents a side view of my improved saw-set. Fig. 2 is a bottom view of the same. Fig. 3 is a vertical longitudinal sectional view of the same. Fig. 4 is a cross-sectional view on the line 4 4, Fig. 1.

Similar letters of reference indicate corresponding parts.

The shank or body A is provided with the handle B at one end and at the opposite end with the hook-shaped lug C, forming the recess C' between said lug and the end of the shank or body A. Said lug is provided with laterally-projecting flanges D at the top of the recess C', which form a support for the saw-blade. The anvil E is held in a recess in the inner face of the hook-lug C by a screw E', passed through the lug and into the anvil, the top of said anvil being beveled, as shown at E². The gage-plate F, for adjusting the set of the saw-teeth—that is, their lateral inclination—is secured to a screw F', passed through two lugs F² on the bottom of the shank or body A, and between said lugs F² a milled nut G is held, through which the screw F' passes, so that by turning said milled nut the gage-plate F is moved a greater or less distance toward the anvil E. The sliding gage H is provided on its front beveled ends with flanges H', which extend over the ends of the recess C' and form a stop for the toothed edge of the saw. Said gage is provided with an apertured lug J, through which a screw K passes, that is mounted in lugs L on the upper side of the shank or body A, the screw being provided with a suitable thumb-piece K' for turning it. By turning the set-screw K the gage H is moved toward or from the anvil. As said gage is moved from the anvil it permits a greater insertion of the saw-blade, and as it is moved toward the anvil the beveled flanges H' prevent a greater insertion of the saw-blade. The handle-lever M is provided on its upper side with a lug M', pivoted by a pin M² to suitable lugs A³ on the upper side of the shank or stock A, and a spring N, secured to the shank or stock A, presses said handle-lever upward. The setting jaw or prong O is formed on the end of a push-bar P, located in a recess Q in the under side of the stock or shank A and provided with a turn-buckle R for increasing or decreasing its length, as may be necessary, which bar P is pivoted to the front end of the lever M to form a toggle-lever.

As shown in Fig. 1, the saw-blade (shown in dotted lines) is placed into the recess C' and rests against the gage-plate F and on the beveled flanges H', which gage-plate and flanges are adjusted according to the desired set of the blade and the length of the teeth. The handle-lever M is then pressed toward the handle-lever B, whereby the push-bar P, carrying the jaw or prong O, is pressed against the tooth and presses said tooth against the beveled part E² of the anvil, thereby giving the saw-teeth the desired set or inclination. The push-bar P is normally in inclined position, as shown in Fig. 1, and gradually straightens out as the handle-levers are pressed together, as shown in Fig. 3. Thereby the push-bar P first slightly curves the end of the tooth and finally presses the same laterally, and thus the breaking of the tooth is avoided, and the entire set required can be effected in a single operation. This would not be possible if the tooth would be merely pressed laterally, as there would be danger of breaking off the tooth at its base by giving it so great an inclination in a single operation.

Having thus described my invention, I claim as new and desire to secure by Letters Patent—

1. In a saw-set, the combination, with a shank or body having a hook-lug at one end and a rigid handle at the opposite end, of an anvil on said hook-lug and a handle-lever pivoted to said shank or body to form a toggle-lever, and a setting jaw or prong on the upper end of said push-bar, substantially as set forth.

2. In a saw-set, the combination, with a shank or body having a hook-lug at one end and a handle-lever on the opposite end, of a lever pivoted to said shank or body, a push-bar pivoted to said lever and forming a toggle-joint, a setting prong or jaw on the end of said push-bar, and a turn-buckle for adjusting said push-bar, substantially as set forth.

3. In a saw-set, the combination, with a shank or body having a hook-lug at one end and a rigid handle at the opposite end, of an anvil on said hook-lug, a handle-lever pivoted to the shank or body, a push-bar pivoted to said handle-lever, a gage on the top of the shank or body, a sliding gage on the side of the shank or body, which sliding gage is provided with inclined flanges for supporting the toothed edge of the saw, and means for adjusting said gages, substantially as set forth.

In testimony that I claim the foregoing as my invention I have signed my name in presence of two subscribing witnesses.

HENRY R. BRAUNSDORF.

Witnesses:
OSCAR F. GUNZ,
W. REIMHERR.